US012678373B2

(12) United States Patent
Biehl et al.

(10) Patent No.: US 12,678,373 B2
(45) Date of Patent: Jul. 14, 2026

(54) VALVE UNIT FOR A SYSTEM FOR PRODUCING A MEDICAL PREPARATION

(71) Applicant: Fresenius Kabi Deutschland GmbH, Bad Homburg (DE)

(72) Inventors: Martin Biehl, Bad Homburg (DE); Michael Hock, Bad Homburg (DE); Lothar Tiedemann, Tornesch (DE); Klaus Buettner, Tornesch (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 95 days.

(21) Appl. No.: 18/378,592

(22) Filed: Oct. 10, 2023

(65) Prior Publication Data

US 2024/0033183 A1 Feb. 1, 2024

Related U.S. Application Data

(63) Continuation of application No. 16/641,293, filed as application No. PCT/EP2018/072638 on Aug. 22, 2018, now Pat. No. 11,793,722.

(30) Foreign Application Priority Data

Aug. 23, 2017 (EP) .................................... 17187513

(51) Int. Cl.
*A61J 3/00* (2006.01)
*A61J 1/20* (2006.01)

(52) U.S. Cl.
CPC ............. *A61J 3/002* (2013.01); *A61J 1/2062* (2015.05); *A61J 1/2089* (2013.01); *A61J 1/2096* (2013.01)

(58) Field of Classification Search
CPC ........... A61J 1/2062; A61J 1/002; F16K 1/22; A61M 39/22
See application file for complete search history.

(56) References Cited

U.S. PATENT DOCUMENTS 3,429,273 A 2/1969 Jones, Jr.
3,647,118 A 3/1972 Johnson et al.
(Continued)

FOREIGN PATENT DOCUMENTS

CN 201735060 U 2/2011
CN 102019687 A 4/2011
(Continued)

OTHER PUBLICATIONS

International Search Report and Written Opinion for International Application No. PCT/EP2018/072638, dated Oct. 9, 2018, 17 Pages.

*Primary Examiner* — Timothy P. Kelly
(74) *Attorney, Agent, or Firm* — Blank Rome LLP

(57) ABSTRACT

A valve unit for a system for producing a medical preparation for parenteral nutrition is described. The valve unit includes a housing having a duct extending along a longitudinal access of housing, upper inlets and lower inlets, and an outlet in fluid communication with each of the inlets via the duct. The valve unit includes valves that alternately connect a respective upper inlet of the upper inlets and a respective lower inlet of the lower inlets to the duct. Each of the valves have a first passage that fluidly connects the respective upper inlet and the duct, and a second passage that fluidly connects the respective lower inlet and the duct.

20 Claims, 9 Drawing Sheets

(56) References Cited

U.S. PATENT DOCUMENTS

| | | | |
|---|---|---|---|
| 4,012,176 | A | 3/1977 | Drori |
| 4,132,509 | A | 1/1979 | Bongartz et al. |
| D263,871 | S | 4/1982 | Matsuura |
| 4,473,173 | A | 9/1984 | Degroff et al. |
| 4,960,117 | A | 10/1990 | Moncrief et al. |
| 5,037,390 | A | 8/1991 | Raines et al. |
| 5,040,699 | A | 8/1991 | Gangemi |
| 5,064,358 | A | 11/1991 | Calari |
| 5,228,485 | A | 7/1993 | Lewis et al. |
| D344,585 | S | 2/1994 | Morse |
| 5,460,493 | A | 10/1995 | Deniega et al. |
| 5,697,407 | A | 12/1997 | Lasonde |
| 5,927,349 | A | 7/1999 | Martucci et al. |
| 7,555,437 | B2 | 6/2009 | Pierce |
| 10,369,349 | B2 | 8/2019 | Nelson |
| 10,806,673 | B2 | 10/2020 | Zollinger et al. |
| 10,851,901 | B2 | 12/2020 | Liberman et al. |
| 11,090,479 | B2 | 8/2021 | Biehl et al. |
| 11,793,722 | B2 * | 10/2023 | Biehl ...................... A61J 3/002 |
| 12,171,719 | B1 * | 12/2024 | Wu ....................... A61J 1/2089 |
| 2005/0086008 | A1 | 4/2005 | Digianfilippo et al. |
| 2009/0065724 | A1 | 3/2009 | Mitton et al. |
| 2009/0154764 | A1 | 6/2009 | Khan et al. |
| 2009/0247985 | A1 | 10/2009 | Melsheimer et al. |
| 2012/0123257 | A1 | 5/2012 | Stokes, Jr. et al. |
| 2012/0199239 | A1 | 8/2012 | Okuda et al. |
| 2014/0107480 | A1 | 4/2014 | Spohn et al. |
| 2016/0243001 | A1 | 8/2016 | Kraus et al. |
| 2016/0310362 | A1 | 10/2016 | Lane et al. |
| 2016/0310920 | A1 | 10/2016 | Brown et al. |
| 2019/0070074 | A1 | 3/2019 | Biehl et al. |
| 2020/0276086 | A1 | 9/2020 | Biehl et al. |
| 2020/0289371 | A1 | 9/2020 | Biehl et al. |
| 2020/0289372 | A1 | 9/2020 | Biehl et al. |

FOREIGN PATENT DOCUMENTS

| | | | |
|---|---|---|---|
| CN | 102448597 | A | 5/2012 |
| CN | 104203332 | A | 12/2014 |
| CN | 205154788 | U | 4/2016 |
| CN | 106439107 | A | 2/2017 |
| CN | 106439107 | B | 3/2019 |
| EP | 1148936 | B1 | 7/2006 |
| EP | 1997471 | A1 | 12/2008 |
| EP | 2446875 | A1 | 5/2012 |
| EP | 2947019 | A1 | 11/2015 |
| JP | H07100212 | A | 4/1995 |
| JP | H9-225008 | A | 9/1997 |
| JP | H11503926 | A | 4/1999 |
| JP | 2009233154 | A | 10/2009 |
| JP | 2013500060 | A | 1/2013 |
| JP | 2015509421 | A | 3/2015 |
| JP | 6506168 | B2 | 4/2019 |
| WO | 84/000138 | A1 | 1/1984 |
| WO | 9963547 | A2 | 12/1999 |
| WO | 2014062614 | A1 | 4/2014 |
| WO | 2017140849 | A | 8/2017 |

* cited by examiner

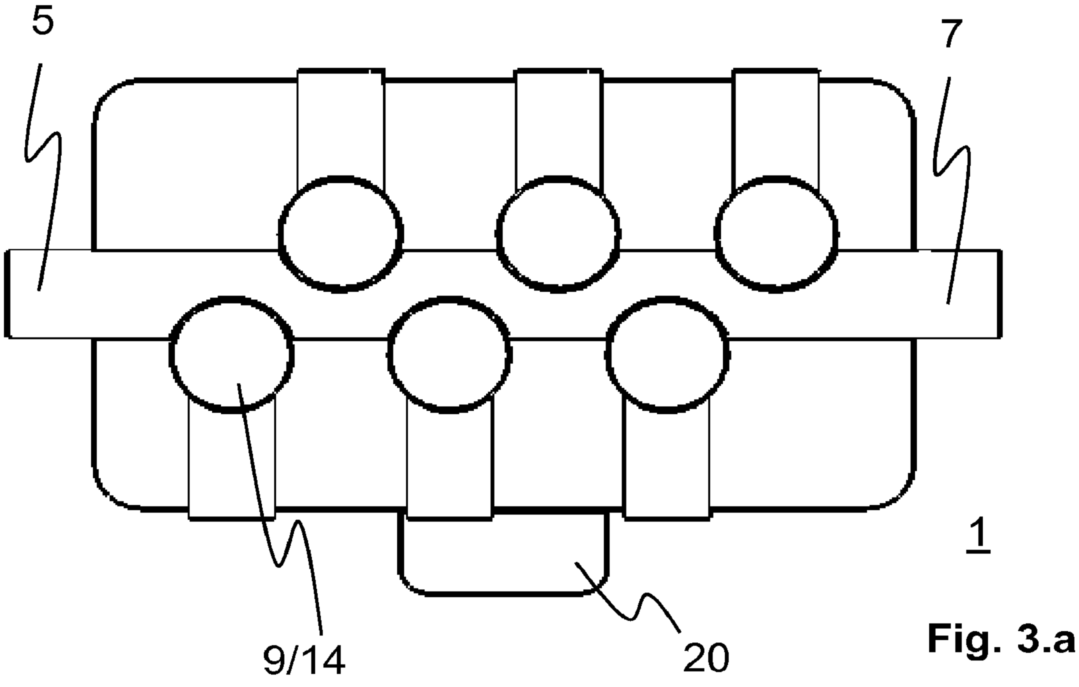
Fig. 3.a
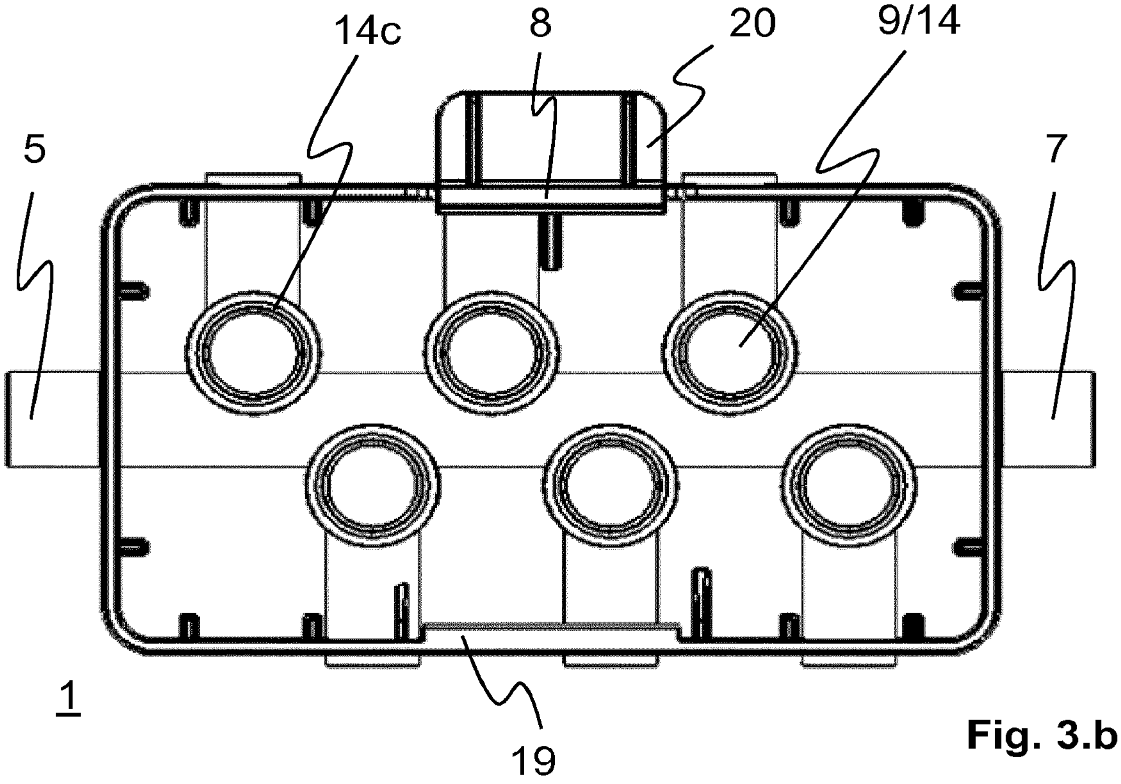
Fig. 3.b

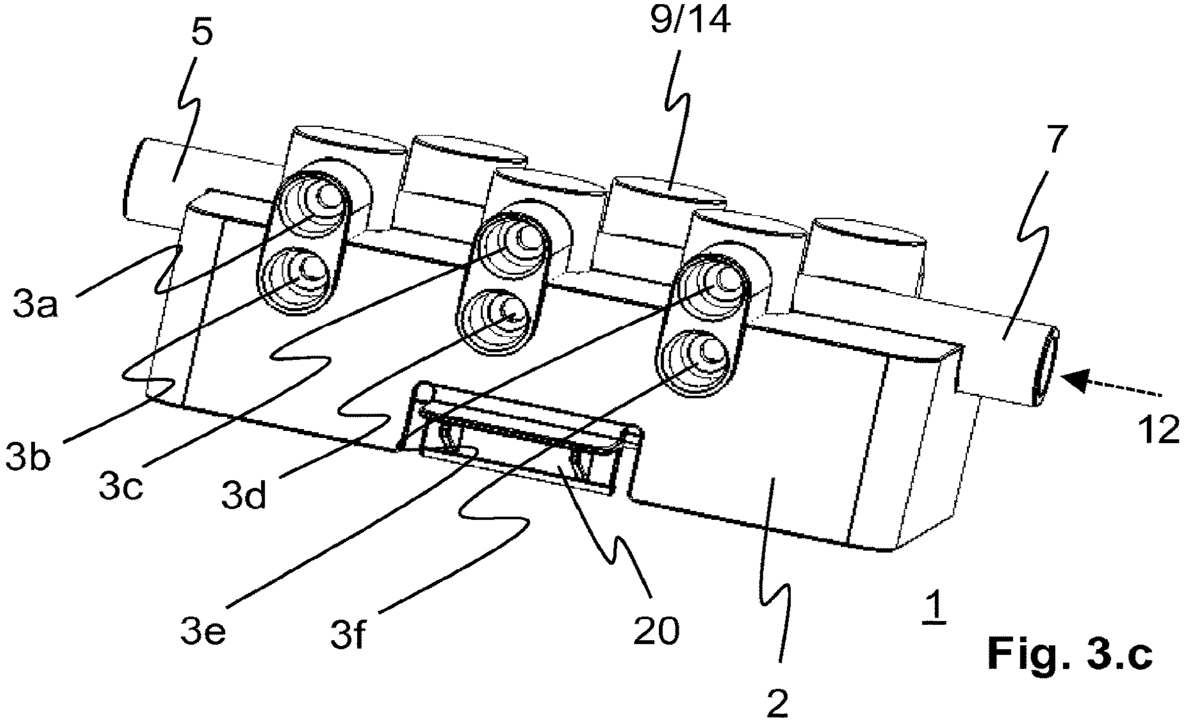
Fig. 3.c
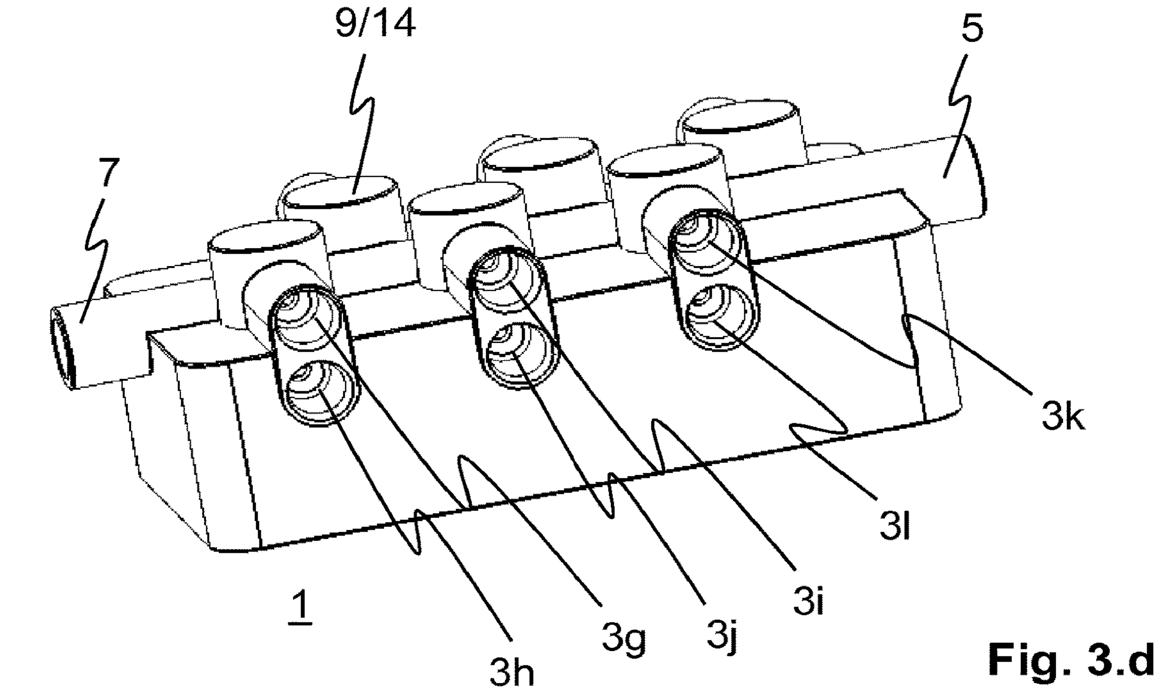
Fig. 3.d

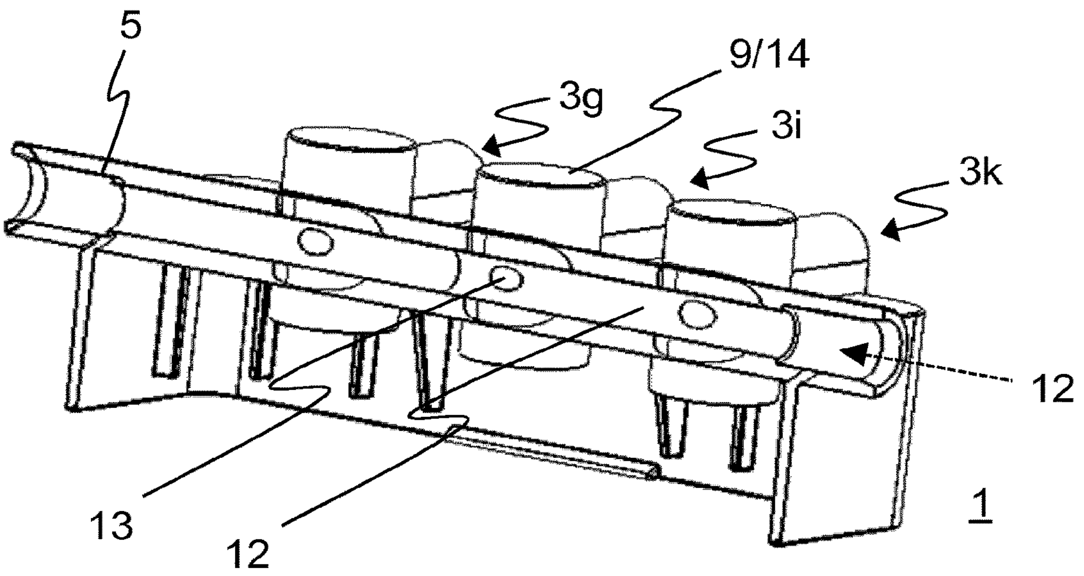
Fig. 4.a
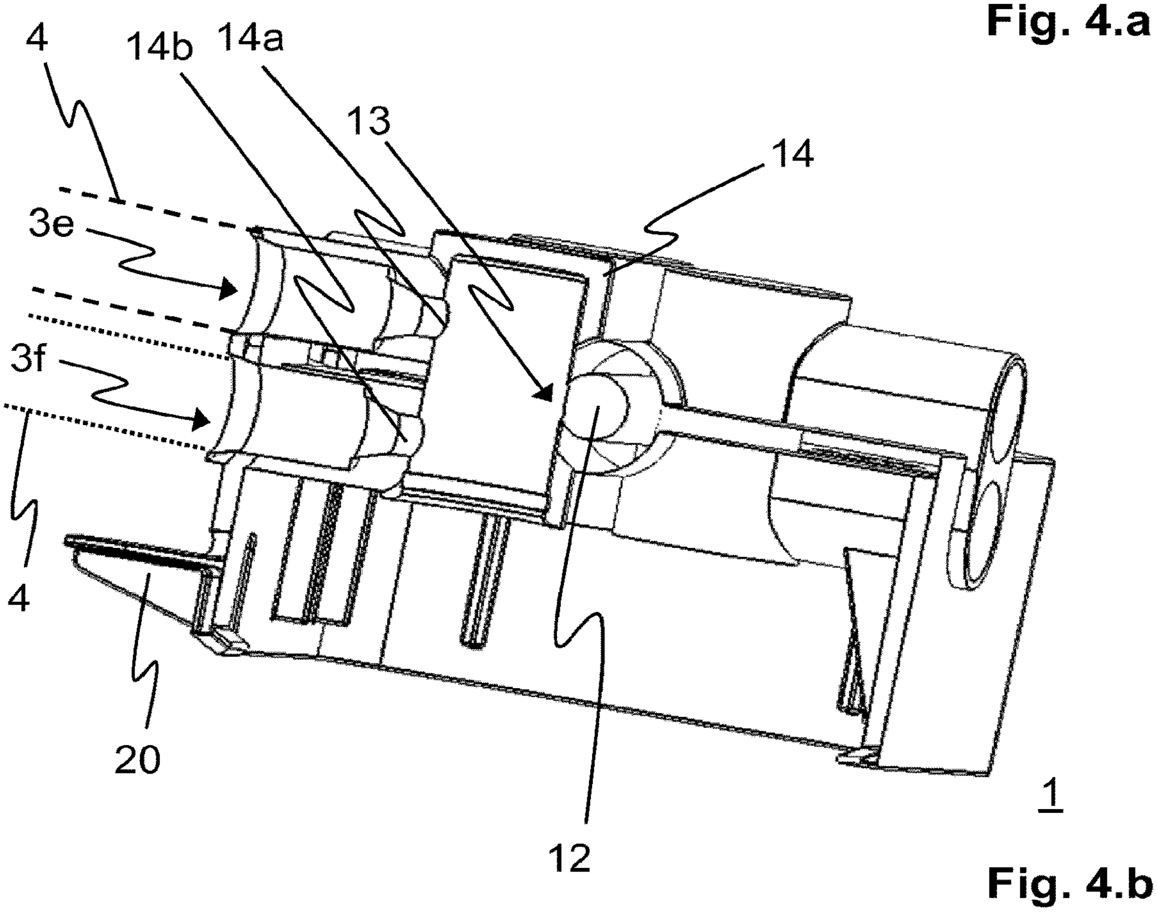
Fig. 4.b

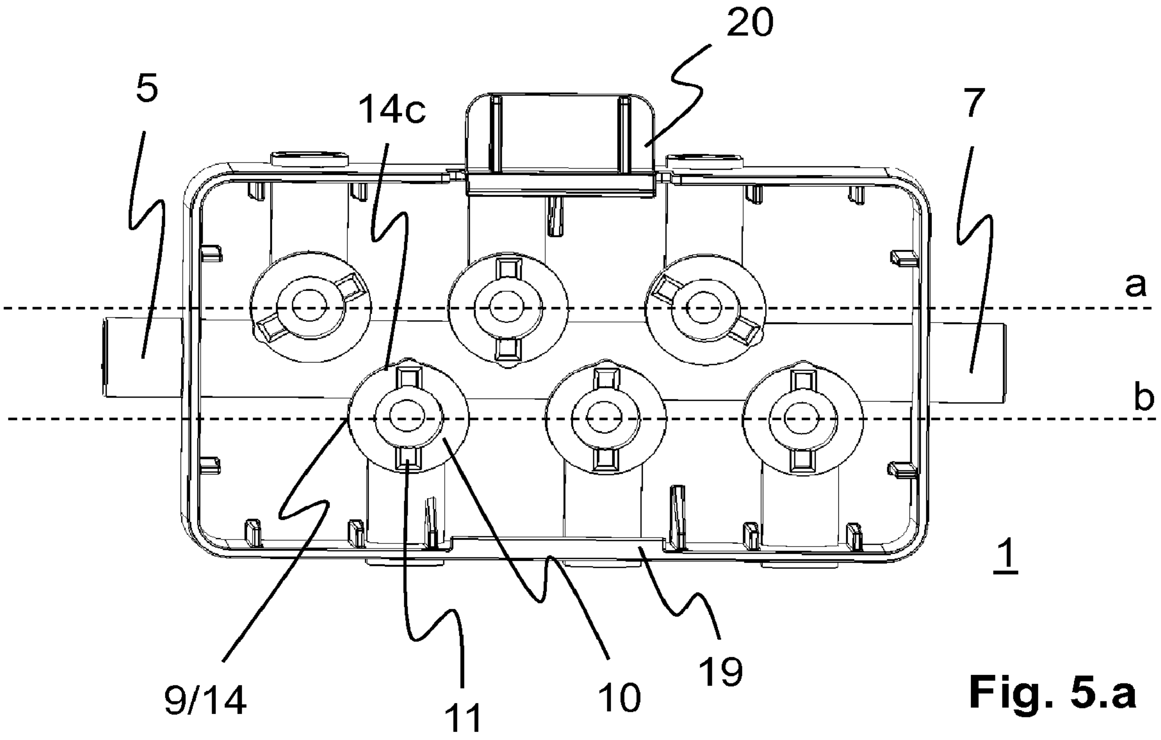
Fig. 5.a
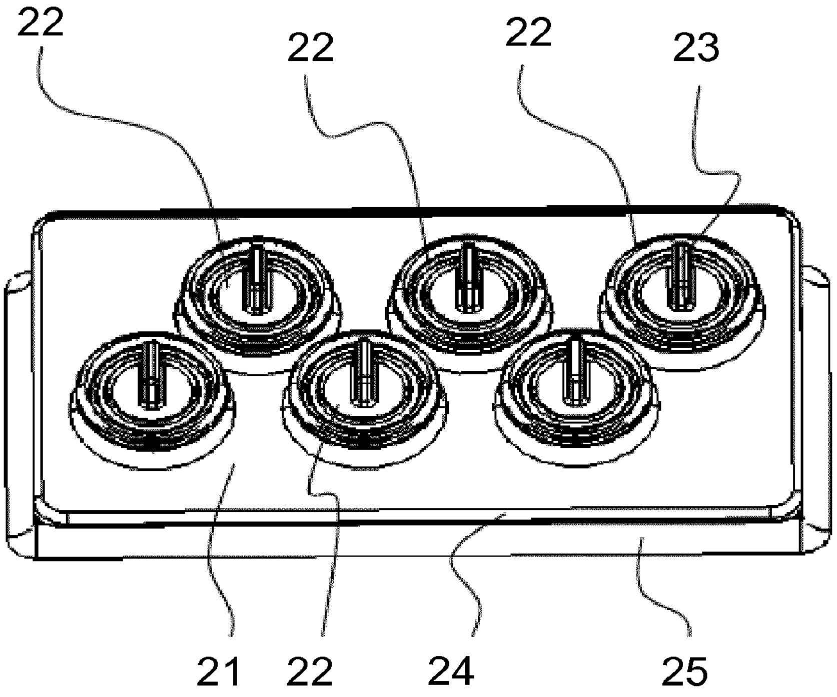
Fig. 5.b

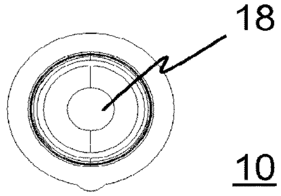
Fig. 6.a
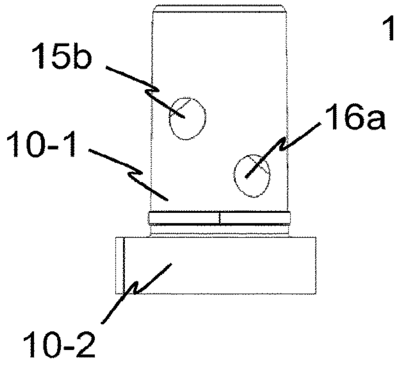
Fig. 6.b
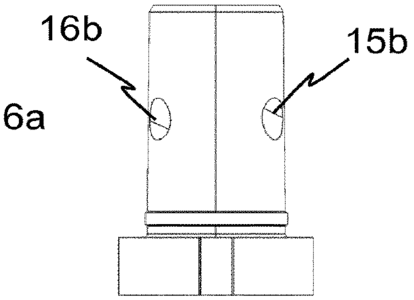
Fig. 6.c
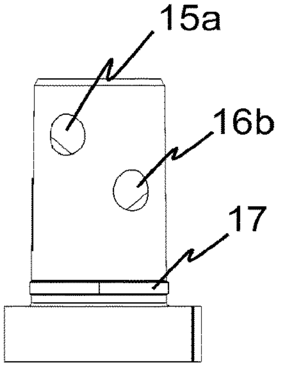
Fig. 6.d
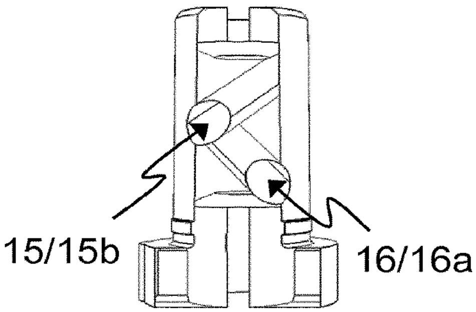
Fig. 6.e
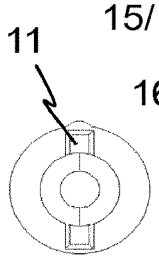
Fig. 6.f
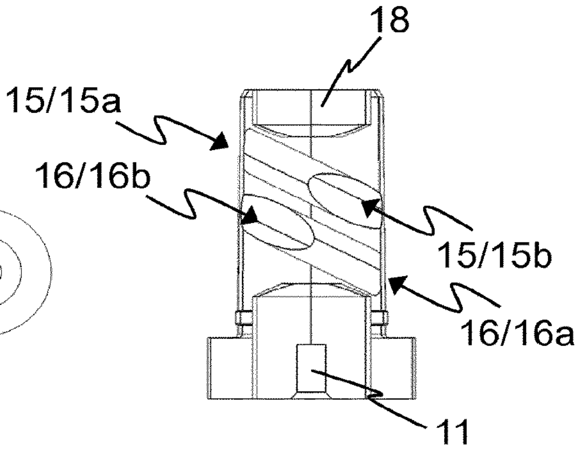
Fig. 6.g

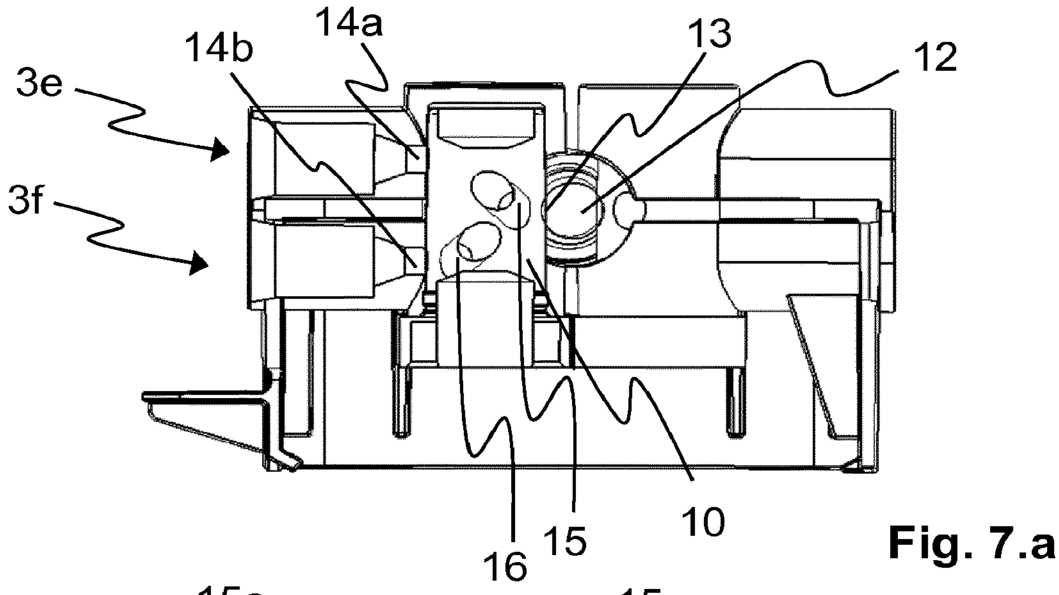
Fig. 7.a
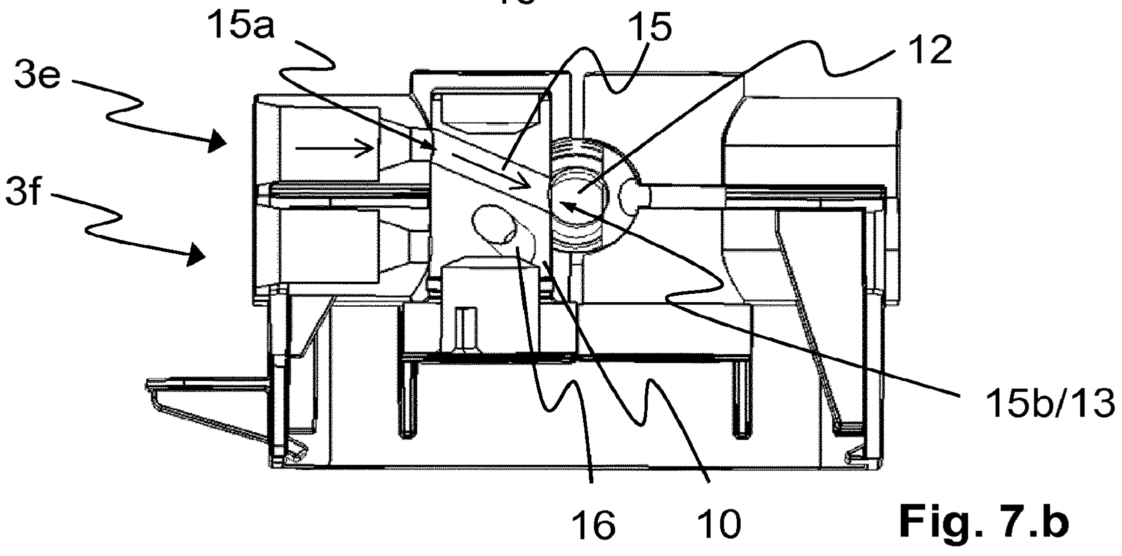
Fig. 7.b
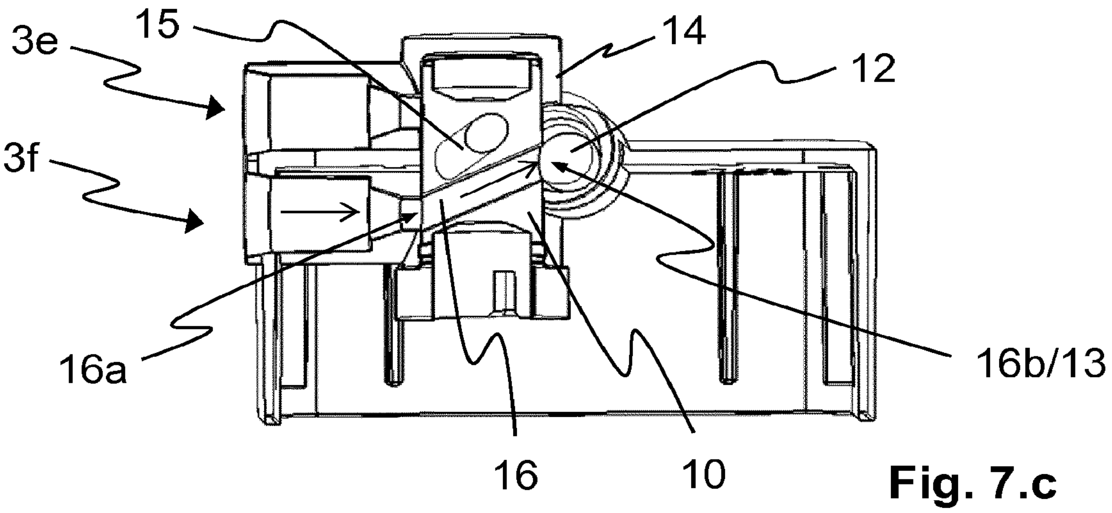
Fig. 7.c

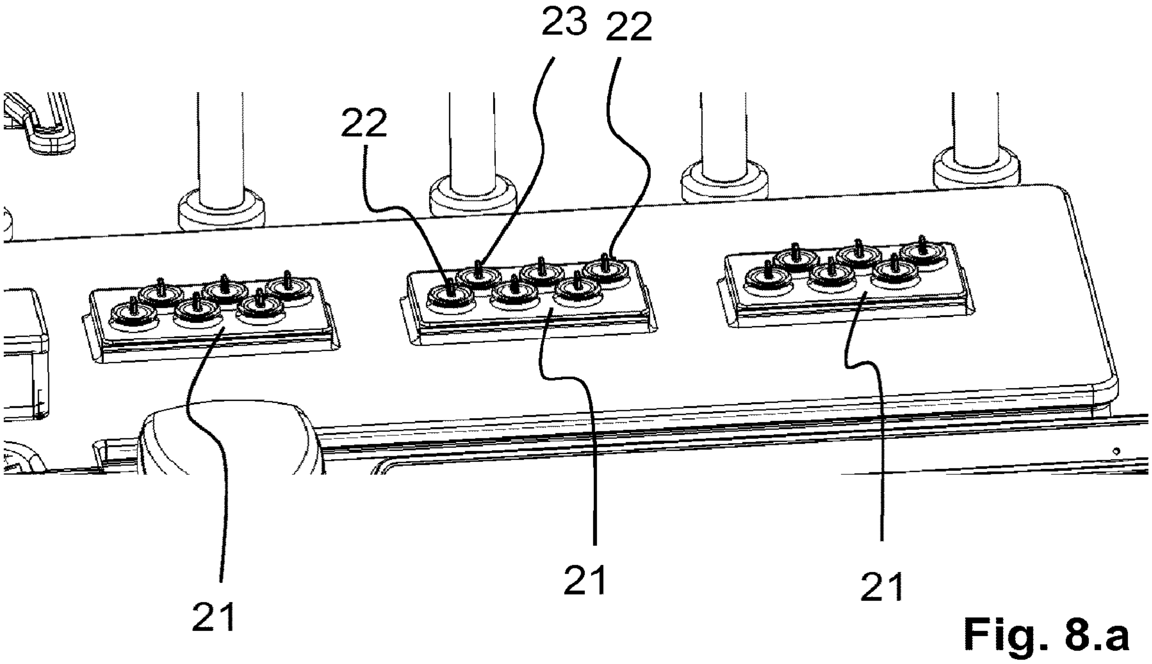
Fig. 8.a
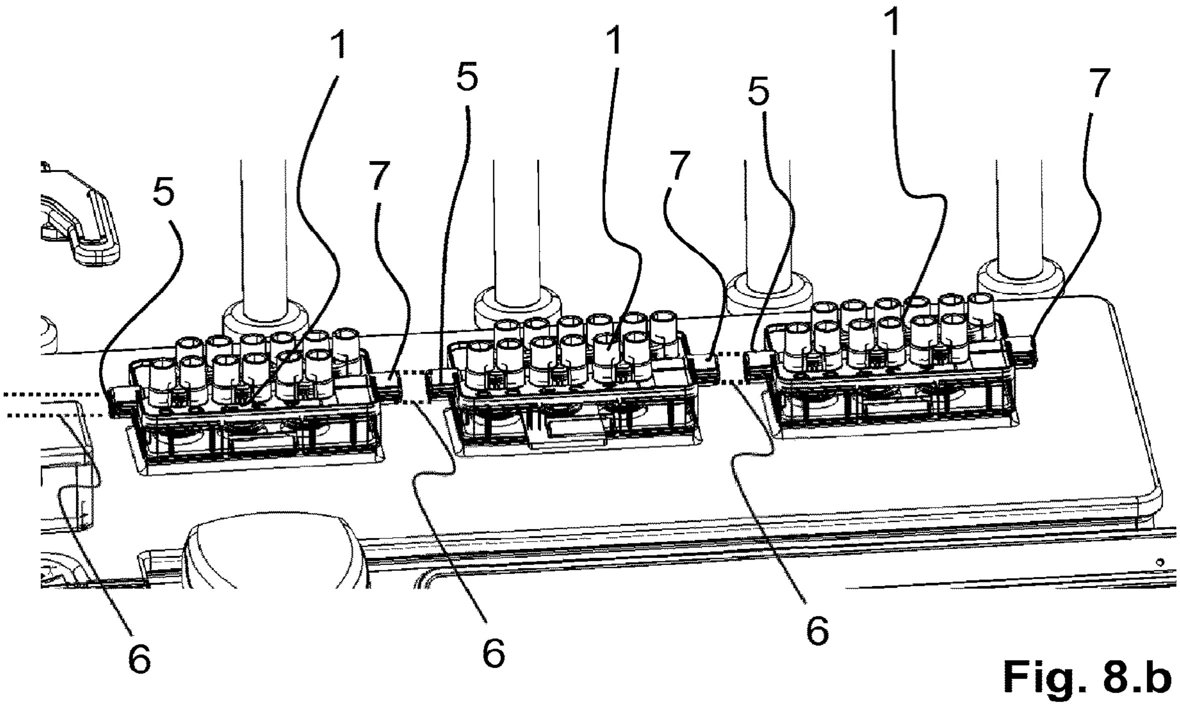
Fig. 8.b

VALVE UNIT FOR A SYSTEM FOR PRODUCING A MEDICAL PREPARATION

CROSS REFERENCE TO RELATED APPLICATIONS

This application is a continuation of U.S. patent application Ser. No. 16/641,293, filed Jun. 16, 2020, which is a U.S. National Stage Patent Application of International Patent App. No. PCT/EP2018/072638, filed Aug. 22, 2018, which claims the benefit of European Patent App. No. 17187513.1, filed Aug. 23, 2017, the disclosures of which are hereby incorporated by reference herein.

FIELD OF THE INVENTION

The invention relates to a valve unit for a system for producing a medical preparation. The invention relates in particular to a valve unit for a system by way of which infusion pouches or syringes for parenteral nutrition are filled, for example.

BACKGROUND OF THE INVENTION

Systems for producing a medical preparation, in particular for producing a preparation for parenteral nutrition, are used, for example, in pharmacies, compounding centers, or hospitals, in order for a patient-specific preparation, in particular a mixture from various basic nutrients, trace elements, and vitamins, optionally also conjointly with a medication, to be filled.

Systems of this type are also referred to as TPN compounders (TPN=total parenteral nutrition). Systems known in practice and commercially available such as, for example, the MultiComp® system by the Fresenius company, comprise a computer-controlled pump unit by way of which the component parts of the composition are transferred from different source containers into a target container that is situated on a balance.

At least in the case of a separate pump not being available for each source container, it is necessary for the metering from different source containers to be controlled by way of valves.

It is disadvantageous that the provision of valves is complex. Because of the poor cleaning capability of reusable valves, the latter are not considered in most instances.

OBJECT OF THE INVENTION

By contrast the invention is based on the object of providing a valve unit for a system for producing a medicinal preparation, said valve unit being designed in a simple and compact manner and in particular also being able to be provided in a sufficiently cost-effective manner as a single-use component, thus as a so-called disposable item.

SUMMARY OF THE INVENTION

The object of the invention is already achieved by a valve unit as claimed in one of the independent claims.

Preferred embodiments and refinements of the invention are to be derived from the subject matter of the respective independent claims, the description, and the figures.

The invention relates to a valve unit for a system for producing a medical preparation. The valve unit can in particular be fastened to the system and be removed again after use.

The invention relates in particular to a valve unit for a system for preparing parenteral nutrition, thus a system by way of which the ingredients from various source containers are supplied to a target container in a patient-specific composition.

The valve unit comprises a housing having a multiplicity of inlets, wherein the inlets are connectable to an outlet by way of valves. The target container is filled by way of the outlet.

The valve unit is in particular configured as a replaceable single-use component, preferably in the manner of a cartridge, wherein the valves have engagement means for the mechanical activation for opening and closing.

By way of said engagement means which are in particular configured as slots, valves sitting in the housing can be activated, in particular opened and closed, by way of a motor present in the system.

A plurality of valves can indeed be simultaneously activated. However, only one valve is typically opened at any time during the operation of the system such that liquid can only be retrieved from one source container. The different component parts for filling the target container are thus successively transferred from various source containers into said target container by way of the various inlets.

According to the invention, the valves are configured at least as 3-way valves. It has been demonstrated that a valve unit of this type can be implemented in a simple and compact design by using 3-way valves. The multi-directional valve comprises at least two inlets and one outlet such that two source containers can be connected to a single valve. According to the invention, or preferably, at least part of the inlets are disposed laterally on the housing. In one embodiment of the invention, all inlets of the valve unit are disposed laterally on the housing. The inlets are preferably disposed on both sides of the housing. On account thereof, the guiding of hoses fastened to the valve unit can in particular be improved. For example, the hoses are less contorted. This results in a simpler liquid path.

Valves which are configured as 3/3-way valves having one blocked position, preferably a blocked central position, are in particular used. A single valve can thus open and close the inlets of two source containers.

The valves are preferably configured as cock plug valves.

In one embodiment of the invention, the valves are disposed in at least two, preferably straight, rows. The valves present in the rows are preferably disposed so as to be mutually offset. One valve of one row is preferably disposed so as to be centric in relation to the opposite valves of the other row.

When seen in a plan view of the valve unit, the valves, and thus the engagement means for the mechanical activation, thus do not form an arrangement in which virtual straight lines that connect the valves intersect at right angles.

Rather, the valves, and thus the engagement means for the mechanical activation, are preferably disposed according to the principle of the hexagonal pack of highest density, but so as to be mutually spaced apart.

The valves can thus be placed together more densely, this likewise enabling a more compact design embodiment. This results in particular in a reduced volume of the valve unit and thus in a reduced dead volume.

By contrast, the inlets of the valves can be disposed laterally in rows.

In one embodiment, two lateral inlets are in each case assigned to each valve. The two inlets are preferably disposed at dissimilar height levels. Said inlets provide an upper inlet and a lower inlet. The upper inlet and the lower inlet are in particular disposed on top of one another.

In one embodiment of the invention, the inlets on one side are disposed in at least two, preferably straight, rows. The inlets of the one side are preferably disposed so as to be offset in relation to the inlets of the other side. Two inlets of one valve are in each case preferably disposed so as to be centric in relation to the opposite inlets of the valves of the other side.

The valves are preferably adjacent to a duct in the housing of the valve unit, wherein an opening is present between the duct and an outlet of the valve. The duct preferably has openings which laterally lead off to the valves.

The opening can in each case be implemented, for example, in that the valve housing has a rotationally symmetrical shape, the cock plug of the valve being able to rotate within said rotationally symmetrical shape. The valve housing is preferably configured so as to be substantially circular-cylindrical. This circular-cylindrical shape in a plan view overlaps with the duct such that the opening and thus the discharge unit of the 3-way valve is configured at the overlap point.

The duct in turn is connected to the outlet of the valve unit which serves for filling the target container.

The duct preferably has a consistent diameter, at least in the region of the valves. This leads to the valves of preferably identical embodiment being connected to the duct also by way of an opening of identical size, this in turn ensuring an identical flow rate or flow resistance of the various valves in the opened state.

The housing of the valve unit is preferably configured as an injection-molded component. The material of the valve housing is or comprises the same material as that of the valve cock plugs. The material of the valve housing is or comprises copolyester, for example. The housing can in particular have a cuboid basic shape.

In one embodiment of the invention, the base of the housing is open and serves for receiving the system-related drive means once the housing has been placed onto the system.

The valves, in particular the valve housings which serve for receiving the cock plugs, can be part of a plate of the housing.

In one embodiment of the invention, the duct is disposed in an integrally configured housing portion, in particular in an integrally configured housing.

The valve unit is preferably provided as a so-called "disposable" for single use. Single use is understood to be a design embodiment of the valve unit for which cleaning and re-use is not envisaged.

In one refinement of the invention, the inlets of the valve unit comprise in each case one hose, wherein hoses of at least two diameters are provided or can be provided.

It is in particular provided that hoses of source containers for so-called micro-quantities, thus preparations which comprise, for example, trace elements, vitamins or other media, and are fed in comparatively small doses, are designed with a smaller internal diameter than those hoses by way of which the main component parts, for example sugar solutions, fatty acids, amino acids, are metered. A thinner hose can have a diameter which is less than the at least half the internal diameter of the larger hose, for example.

In one embodiment it is also provided that hoses of dissimilar lengths are used. It is in particular provided that the thicker hoses for metering the main component parts of the preparation are configured so as to be longer. Comparatively large source containers can thus be suspended from a more remote position of the system, for example from a bar.

Comparatively small source containers can be disposed closer to the valve unit, this further reducing the residual quantities of these often more expensive component parts of the preparation when the valve unit is replaced.

The valve unit has in particular a number of inlets which is an integer multiple of 2. The valve unit preferably comprises at least four, particularly preferably at least eight, most particularly preferably twelve, inlets.

The valve unit can be fastened to the system. The housing of the valve unit can in particular comprise latching means so as to be able to be fastened to the system in a simple manner.

After use, the valve unit can be removed from the system again and preferably be replaced by a new valve unit. Therefore, the latching means mentioned above are designed so as to be releasable in this variant. The latching means are preferably releasable when viewed from one side of the valve unit such that the latching mechanism can be released from the front, for example, and the valve unit can be easily removed. This can be implemented, for example, by way of a collar which engages on a form-fitting element on the system, and a sprung latching hook on the opposite side of the valve unit.

In one embodiment of the invention the valve unit comprises valves having cock plugs, in particular from copolyester, which are preferably inserted in the housing in a lubricant-free manner. In one embodiment the cock plugs are provided by a thermoplastic elastomer.

It has been demonstrated that a positive sealing effect can be achieved in a very simple manner by way of cock plugs which are configured so as to be substantially circular-cylindrical and which are pressed into a valve housing of circular-cylindrical configuration.

The cock plugs on a lower side preferably have an engagement element, in particular a slot, by way of which the cock plugs by way of a valve control unit present on the system can be activated from the system by a motor.

Apart from the hoses and the connectors thereof, the valve unit can be composed of only the housing and the cock plugs inserted into the housing, and is thus configured in a simple manner from few parts.

The valve unit on the upper side thereof is preferably at least partially closed such that the cock plugs has or can have a detent in the direction of insertion. This prevents the cock plugs penetrating the valve housing when assembling the valve unit. On the other hand, the cock plug can be embodied having two portions. Said cock plug can have a lower portion having a larger diameter, and an upper portion adjacent to the former. The upper portion preferably achieves the sealing by way of a surface seal. The lower portion can serve as a detent for the assembling in the valve housing, and in particular for providing the engagement element. When the valve unit is placed onto the system according to the intended use, the cock plug is thus positionally secured by the detent in one direction, and in the other direction by engagement means of the motorized drive of the system.

In one further embodiment the cock plugs are fastened so as to snap into the valve housing. To this end, the cock plugs preferably have at least one web on an external side of the shell. The valve housings provide a depression or a protrusion for receiving the web. This design embodiment serves to prevent the cock plug being unscrewed from the cartridge on account of the rotating movement and thus to be incorporated in a positionally secured manner in said cartridge.

In one refinement of the invention the outlet of the valve unit is connected to a hose which comprises, for example, at least three portions, wherein a central portion has a cross section which is enlarged in comparison to the adjacent portions.

It is in particular provided that the hose present on the outlet is used for a peristaltic pump, in particular for a hose pump, for example a roller pump or finger pump, wherein the central portion is inserted into the pump. In pumps of this type, the medium is conveyed by periodically squeezing a hose. The enlarged cross section of the central hose portion is selected such that said cross section can be used for the peristaltic pump used. The cross sections of the two other hose portions are preferably conceived with a view to the required volumetric flows.

The entire distance from the source container up to the connection of the target container is thus configured as a single-use component. No components, for example parts of a pump, come into contact with the transferred media.

The invention furthermore relates to a valve unit for a system for producing a medical preparation, in particular to a valve unit having one or a plurality of the features mentioned above.

The valve unit likewise comprises a housing having a plurality of inlets, wherein the inlets by way of valves are connectable to an outlet.

According to the invention, the valves comprise cock plugs which are inserted into the housing. The valves are preferably merely press-fitted into the valve housings which are configured in the housing of the valve unit, and preferably fastened so as to snap into said valve housing.

In one embodiment, the valves comprise cock plugs, wherein in an opened position a fluid is guidable through an interior space of the cock plugs which in portions is hollow.

In one preferred embodiment of the valve unit the fluid guiding takes place by way of at least two through holes which are incorporated into the cock plugs. The two through holes preferably extend through a longitudinal axis of the cock plugs.

The two through holes have in a shell face of the cock plugs in each case one entry and one exit, wherein the exits of the two through holes preferably lie at substantially identical height levels. In particular, the exits of the two through holes preferably lie at a substantially identical height level as the openings which from the duct lead off laterally to the valves.

By contrast, the entries of the two through holes preferably lie at dissimilar height levels. Said entries define an upper entry and a lower entry. The upper entry lies above the two exits. The lower entry lies below the two exits. The upper entry of the upper through hole herein preferably lies at a substantially identical height level as an upper inlet. The lower entry of the other lower through hole preferably lies at a substantially identical height level as the one lower entry.

According to a further aspect of the invention, the inlets of one valve unit comprise in each case one hose which is non-separably connected to the housing, for example by welding or adhesive bonding.

A non-separable connection is understood to be a connection which in the intended use cannot be released in a non-destructive manner.

The simplifies the use of the valve unit since the user does not have to connect any hoses. Safety is also enhanced, since no connectors can be confused on the one hand, and individual hoses cannot be used multiple times in an inadmissible manner on the other hand.

The valve unit is connected to the source containers by way of the hoses. Said valve unit is provided for filling, for example a specific volumetric quantity, into a plurality of target containers, or for use over a specific temporal period. The valve unit is removed and replaced by a new one after a predefined volume has passed through, and/or after a predefined temporal period has expired.

The outlet of the housing is also preferably connected in a non-separable manner to a hose by way of which the preparation is transferred into a target container. The connection can be configured in a manner analogous to the connection between the inlets and the hoses.

BRIEF DESCRIPTION OF THE DRAWINGS

The subject matter of the invention is to be explained hereunder with reference to an exemplary embodiment by means of the drawings in FIG. 1 to FIG. 8*b*, in which:

FIGS. 3*a* and 3*b* show a view onto the upper side and onto the lower side of the valve unit;

FIGS. 3*c* and 3*d* show in each case a perspective view onto the two lateral walls of the valve unit;

FIGS. 4*a* and 4*b* show a perspective sectional view of the valve unit along the longitudinal axis L (FIG. 4*a*) and along the transverse axis Q (FIG. 4*b*) from FIG. 2;

FIG. 5*a* shows a view onto the lower side of the valve unit, having inserted cock plugs;

FIG. 5*b* shows a perspective view onto the associated receptacle on the system for the valve unit;

FIGS. 6*a* and 6*g* show various views of a cock valve to be inserted into the valve unit in a view onto the upper side (FIG. 6A), in a lateral illustration which is in each case rotated by approximately 90° (FIGS. 6*b* to 6*d*), in a cut-away lateral view (FIG. 6*e*), and in a view onto the lower side (FIG. 60; as well as in a further rotated cut-away lateral view (FIG. 60;

FIGS. 7*a* and 7*c* show a sectional view of the valve unit having inserted cock plugs in various valve positions: in the closed position (FIG. 7*a*) and in the opened position having an opened upper passage opening (FIG. 7*b*), as well as having an opened lower passage opening (FIG. 7*c*); and FIGS. 8*a* and 8*b* show in each case a perspective view onto the receptacle on the system for a plurality of valve units, without valve units (FIG. 8*a*) and having valve units placed thereon (FIG. 8*b*).

DETAILED DESCRIPTION OF THE DRAWINGS

Figure 1:
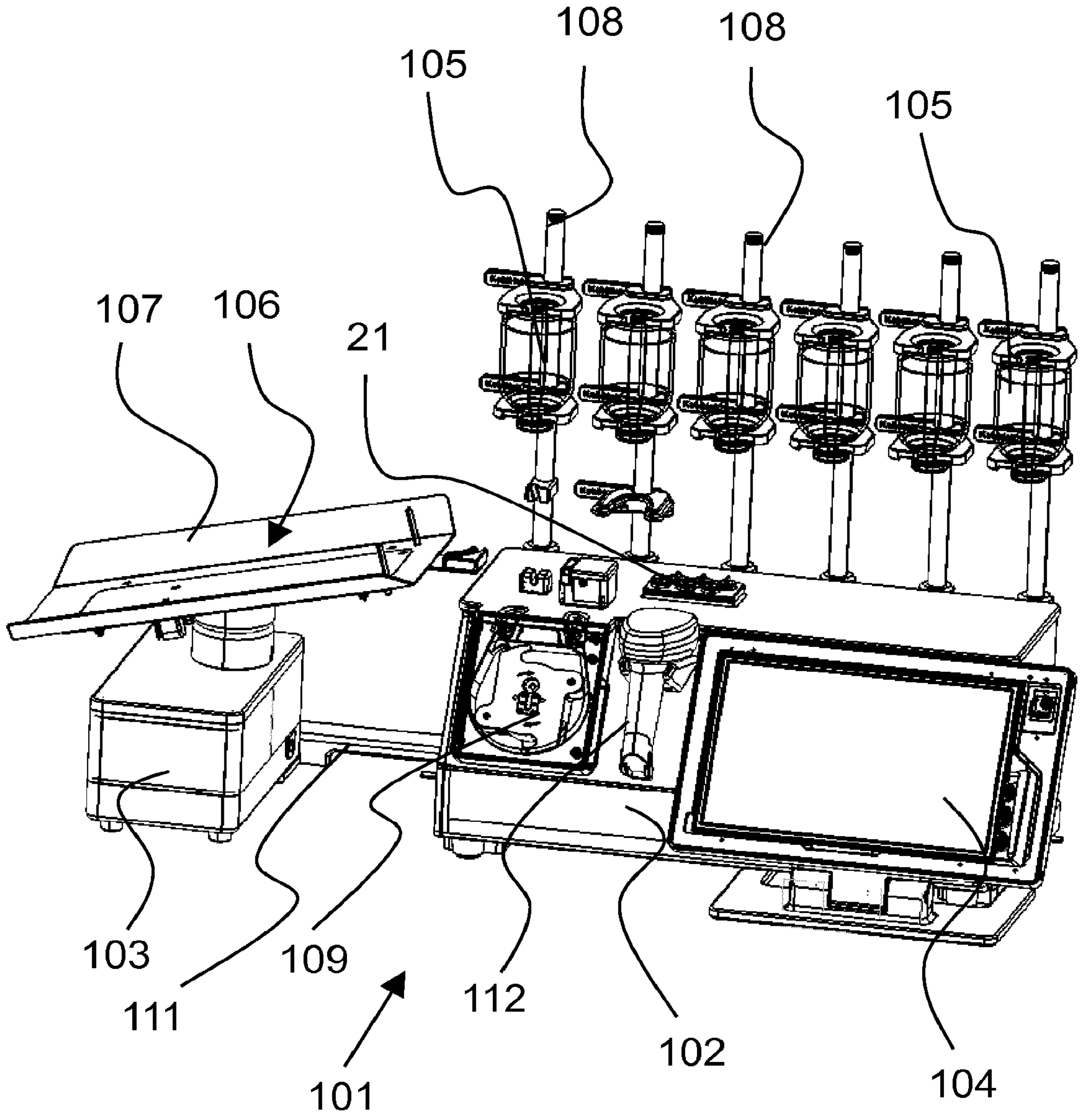
FIG. 1 shows a schematic illustration of a system for producing a medical preparation.
Figure 2:
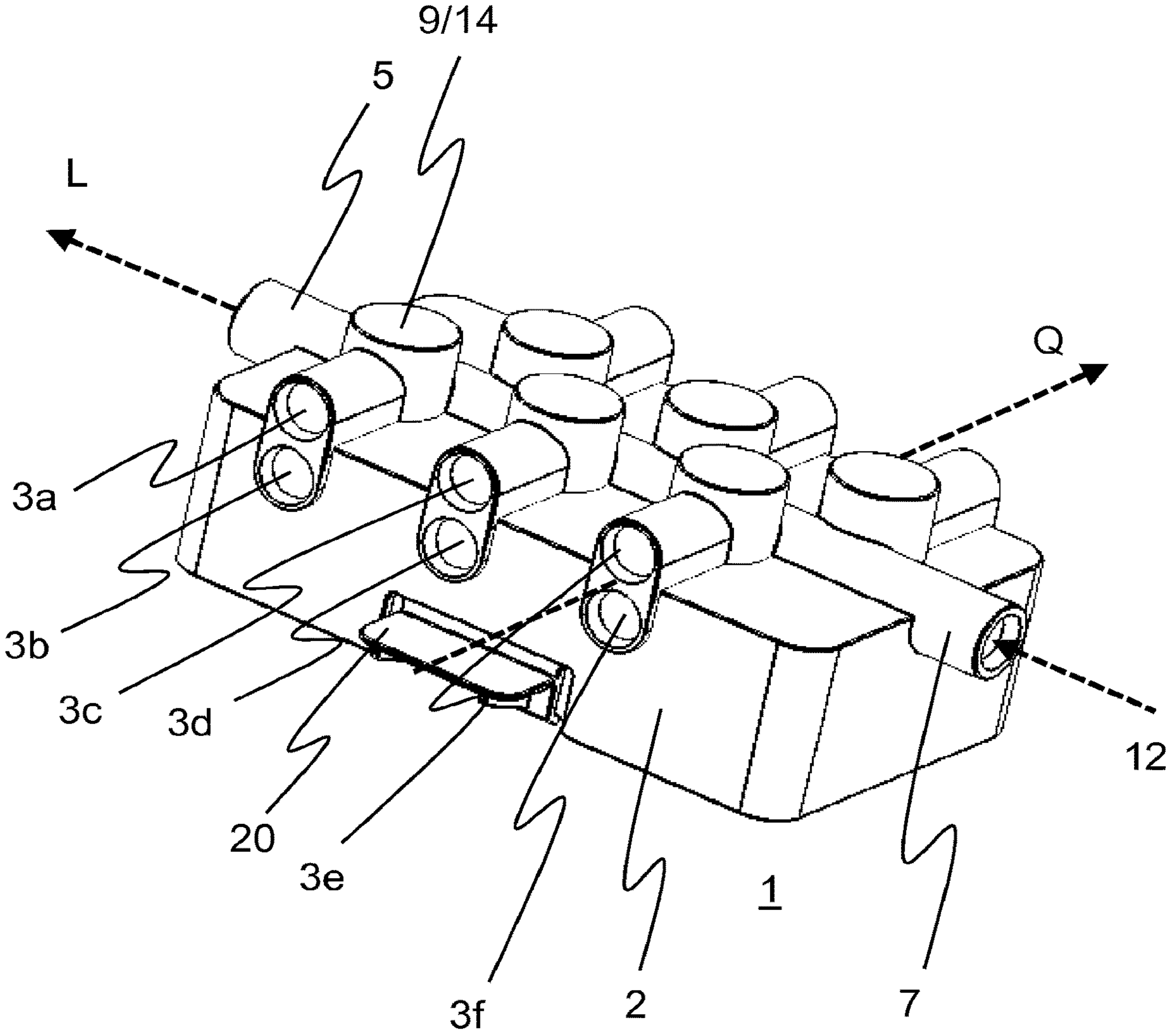
FIG. 2 shows a perspective wireframe illustration of a valve unit according to the invention (without hoses)

FIG. 1 in a perspective view shows a system 101 for producing a medical preparation in the form of a parenteral nutrition preparation.

The system 101 here is of modular construction and comprises a main module 102. The main module 102 comprises a pump 109 which is preferably configured as a hose pump (for example a peristaltic pump). The main module 102 furthermore comprises a scanner 112 by way of which formula data, bar codes on target containers 106 and/or source containers 105 and/or associated hoses can be read.

The target container 106 per se is not illustrated, but only the position thereof on the balance 103 is. A receptacle 21 for a valve unit 1 is disposed on the upper side of the main module 102. However, a plurality of valve units 1 can also be provided so as to be connected in a cascading manner (see to this end FIGS. 8*a* and 8*b*). A valve unit can also be referred to as a valve node.

Apart from the main module 102, the system 101 comprises a balance module 103 as well as a display screen module 104. The balance module 103 comprises a balance tray 107 into which a target container 106 (not illustrated here) can be placed. The balance module 103 and the main module 102 here are placed onto a sub-frame 111 which ensures that the balance module 103 and the main module 102 are mutually positioned in a consistent manner.

The intermediate space between the balance module 103 and the main module 102 is partially spanned by the balance tray 107 such that the connection of the target container 106 lies close to the upper side of the housing of the main module 102. Furthermore, the balance tray 107 in relation to a horizontal plane is inclined upward in the direction of the main module 102. On account thereof, the connector of the target container 106 is likewise moved close to the upper side of the main module 102. This reduces the length of a hose for connecting the target container 106 to the valve unit 1. The hoses are not illustrated in this view.

Furthermore to be seen are bars 108 on which a plurality of source containers 105 are disposed. In order for the system 101 to be operated, the source containers 105 are connected to the valve unit, or valve units, 21, respectively, by way of hoses. The hose used for connecting the target container 106 herein is guided through the hose pump 109. By means of the hose pump 109, the desired preparation can be transferred in a computer-controlled manner into the target container 106 by way of the valve unit, which here is composed of the single valve node 21.

In a filling procedure, one of the valves 9 is opened such that in a metering step liquid from a source container 105 is pumped into the target container 106 by the pump 109. Thereafter, the next valve 9 is opened. Liquids are retrieved from the various source containers 105 until the filling procedure is completed.

During each individual metering step, only a single valve 9 which leads to a source container 105 is preferably opened at any one time. Liquid is thus preferably retrieved from only one source container 105 at any one time.

FIGS. 2 and 3*a* to 3*d* in various illustrations show an embodiment of a valve unit 1 which is preferably configured as a single-use component. The valve unit 1 is preferably configured so as to be integral.

The valve unit 1 comprises a housing 2 from plastics material. Said housing 2 can be configured in the manner of a cartridge. The housing 2 possesses an upper side, a lower side, in the direction of the outlet 5 a front side, and in the direction of the connector 7 a rear side. The lateral walls are laterally disposed. Said lateral walls are situated between the front side and the rear side.

The housing 2, configured so as to be cuboidal, here laterally comprises in each case a plurality of inlets 3*a*-3*l*. In this exemplary embodiment, twelve inlets 3*a*-3*l* are present, of which only the six inlets 3*a* to 3*f* on one side can be seen. The valve unit 1 can also be configured so as to have more or fewer inlets 3*a*-3*l*. The inlets 3*a*-3*l* here are disposed so as to be substantially parallel to the upper side of the housing 2, or (in the assembled state) so as to be parallel to the upper side of the system 101. The inlets 3*a*-3*l* are disposed so as to be substantially horizontal.

The housing 2 preferably has a height of 2 to 6 cm, a width of 6 to 12 cm, and a depth of 3 to 8 cm.

Two inlets, in this exemplary embodiment for example the inlets 3*a* and 3*b*, as well as the inlets 3*c* and 3*d*, and 3*e* and 3*f*, respectively, are in each case opened and closed by in each case one single valve 9, here configured as a 3-way valve 9.

The variant of embodiment of a valve unit 1 illustrated comprises six 3-way valves. Each inlet 3*a*-3*l* is connected to one flexible hose 4 (not illustrated). In one embodiment the hoses 4 are connected, preferably welded or adhesively bonded, to the inlets 3*a*-3*l* in such a manner that said hoses 4 cannot be released in a non-destructive manner. The hoses 4 can possess a smaller and a larger diameter. The hoses 4 having smaller diameters can serve for metering micro-quantities.

A target container 106 (not illustrated) can be filled by way of an outlet 5 and a hose 6 (not illustrated here) to which the outlet 5 is preferably connected in a likewise non-separable manner.

In this exemplary embodiment a further connector 7 is provided on the side opposite the outlet 5. The valve unit 1 can be connected from both sides by way of the connector 7. An outlet 5 or connector 7, respectively, which is not required can simply be closed.

Also to be seen in the illustration in FIG. 3*b* is in particular the latching hook 8 for latching the valve unit 1 to a system 101. On the opposite side, the housing 2 is held by way of a collar 19 which engages below a form-fitting element on the system.

In order for the valve unit 1 to be removed, the user only needs to pull from the front upward on the handle 20 of the sprung latching hook 8, and the latching mechanism is released such that the valve unit 1 can be removed.

Furthermore to be seen are the valves 9. The valve housing 14 of the valves 9 protrudes from the upper side of the housing 2. In the figure, only one valve 9 is marked with a reference sign.

The valves 9 for in each case two inlets 3*a*-3*l* are preferably configured so as to be identical such that the description hereunder of a valve 9 refers to all of the valves 9 of the valve unit 1.

The valve 9 identified here by the reference sign 9 serves for actuating the inlets 3*a* and 3*b*. The inlets 3*a* and 3*b* are disposed laterally on the housing 2. The inlets 3*a* and 3*b* are mutually adjacent. Said inlets 3*a* and 3*b* here lie on top of one another.

The valve housing 14 preferably has an internal diameter which is 1.1 to 1.5 times the internal diameter of the inlet 3*a*, 3*b*. For example, the valve housing 14 has an internal diameter of 0.5 to 1.5 cm, and/or the inlet 3*a*, 3*b* has an internal diameter of 0.25 cm to 0.75 cm.

FIG. 5*a* shows a view onto the lower side of the valve unit, having inserted cock plugs. The valves 9 have in each case one press-fitted cock plug 10 which comprises a slot 11 which serves as an engagement element for a drive activated by means of a motor (see to this end the entrainment elements 22 having the engagement elements 23 in FIGS. 5*b* and 8*a*).

The complete opening of an inlet 3*a*-3*l* is performed by approximately a rotation of the cock plug 10 of 45° to 70°, or of >45° to 70°. The complete opening of an inlet 3*a*-3*l* is preferably performed by approximately a sixth of a rotation of the cock plug 10, wherein the one connector is opened when rotating in one direction, and the other connector is opened when rotating in the other direction. The rotation for reaching the two open positions is thus performed by substantially +/−60° in relation to the closed central position. 3/3-way valves, preferably having a closed central position, are thus used.

In a plan view the cock plugs 10 are disposed in the two straight rows a and b (see FIG. 5*a*), wherein the cock plugs 10 of the row a are offset axially in relation to the respective opposite cock plugs 10 of the row b.

The cock plugs 10 of the row b are in the central position, the corresponding valves 9 are thus closed. The central cock plug in the row a is likewise closed. By contrast, the left cock plug in the row a is rotated to the right by approximately a sixth of a rotation, and the lower inlet 3*b* is open. By contrast, the right cock plug 10 in the row a is rotated to the left by approximately a sixth of a rotation, and the upper inlet 3*a* is open.

It is however understood that in the operation of the system 101 for producing a medical preparation, only one valve 9 is generally opened at any one time during a metering step. In detail, the valve 9 in this instance is opened only to one inlet of the inlets 3*a* to 31.

It can be seen that the valve housings 14 are formed substantially from a preferably circular-cylindrical duct in or on the housing 2, said duct leading from the lower side of the housing 2 into or to the housing 2. The cock plugs 10 are press-fitted into the housing 2, or into the valve housing 14, respectively, by way of the lower side of the housing 2. The locking of the cock plug 10 in the valve housing 14 is also performed by way of a snap-fit connection. To this end, a web 17 configured on the external side of the cock plug 10 engages in a depression 14*c* in the internal side of the valve housing 14. Alternatively, the web 17 can engage behind a protrusion 14*c* in the valve housing 14.

Each valve housing 14, in a manner lateral toward the external side, comprises two openings 14*a*, 14*b*, which in each case lead to the inlet 3*a* or 3*b*, respectively, on the valve.

In two opened positions of the cock plug 10, a fluid can pass through the cock plug 10 either from the one inlet 3*a* by way of the opening 14*a*, or from the other inlet 3*b* by way of the opening 14*b*, and by way of the opening 13 makes its way out of the valve housing 14 into a central duct 12. The openings 14*a*, 14*b* in this exemplary embodiment are configured substantially as round, preferably circular, holes. Said openings 14*a*, 14*b* preferably lie at a height level above and below the center of the central duct 12 (to this end see FIGS. 4*b* and 7*a*).

The circular-cylindrical shape of the valve housing 14 overlaps in particular the duct 12. The opening 13 of the valve housing 14 thus formed opens into the duct 12. The fluid can flow into the duct 12 through the opening 13.

FIG. 4 presents a perspective sectional view of the valve unit 1 along the longitudinal axis L. The duct 12 preferably possesses a substantially consistent cross section, at least in the region of the valves 9. This ensures openings 13 of identical size in the case of all valves 9, this in turn guaranteeing an approximately identical flow rate of all valves 9 in the opened state. The openings 13 are substantially oval, preferably having the longer extent in the direction of the longitudinal axis L of the housing 2.

FIG. 4*b* presents a perspective sectional view of the valve unit 1 along the transverse axis Q. The sectional illustrations of the inlets 3*e* and 3*f* are illustrated. Said inlets 3*e* and 3*f* are disposed laterally on the housing 2. The inlets 3*e* and 3*f* extend from the housing external side 2 up to the valve housing 14. Said inlets 3*e* and 3*f* possess an inwardly tapered cross section from the external side and by way of the openings 14*a* and 14*b*, respectively, open in each case into the valve housing 14.

The respective inlet 3*e* or 3*f* can be connected to the central duct 12 of the valve unit 1 by way of the cock plug 10 which is press-fitted into the valve housing 14 (see to this end FIGS. 7*a* to 7*c*).

The valve housing 14 can have a ventilation hole on the upper side (not illustrated in the figures). By contrast, a depression 18 is provided in the upper side of the cock plug 10 in the present example (see to this end FIG. 6*g*). The air present in the valve housing 14 can escape by way of said depression 18 when the cock plug 10 is being press-fitted.

FIGS. 7*a* to 7*c* show sectional views of a valve 9 in various positions.

In the view according to FIG. 7*a*, the cock plug 10 of the valve 9 is initially situated in the closed position, preferably the closed central position. The opening 13 between the duct 12 and the valve housing 13 is closed by the cock plug 10. On account thereof, no fluid can make its way into the duct 12 by way of the inlet 3*e* and the opening 14*a*, or the inlet 3*f* and the opening 14*b*, respectively. The sealing of the valve 1, or of the cock plug 10, respectively, in relation to the valve housing 14 takes place by way of a surface seal. The external side of the cock plug 10 herein bears in a sealing manner on the internal side of the valve housing 14.

FIG. 7*b* shows the valve 9 in a first opened position. The upper passage opening 15 in the cock plug 10 connects the opening 14*a* at the inlet to the opening 12 at the duct. In the operation of the system 1, liquid can henceforth be retrieved from a source container 105 which is connected to the inlet 3*e*. In detail, the liquid from the inlet 3*e* herein by way of the opening 14*a* flows into the upper entry 15*a* of the upper passage opening 15 and into the cock plug 10. The liquid then flows into the duct 12 by way of the lower exit 15*b* of the passage opening 15 and the opening 13 at the duct. The fluid flow is indicated by the two plotted arrows.

FIG. 7*c* now shows the valve 9 in a second opened position. The illustration according to FIG. 7*c* corresponds to that of FIG. 7*b* with the difference that the cock plug 10, proceeding from the closed central position illustrated in FIG. 7*a*, is rotated in the opposite direction by approximately a sixth of a rotation. As can be seen in FIG. 7*c*, the inlet 3*f* is henceforth connected to the duct 12. The lower passage opening 16 in the cock plug 10 now connects the opening 14*b* at the inlet to the opening 12 at the duct. In the operation of the system 1, liquid can henceforth be retrieved from a source container 105 which is connected to the inlet 3*f*. In detail, the liquid herein from the inlet 3*f* flows by way of the opening 14*b* into the lower entry 16*a* of the lower passage opening 16 and into the cock plug 10. The liquid flows into the duct 12 by way of the upper exit 16*b* of the passage opening 16 and the opening 13 at the duct. The fluid flow is indicated by the two plotted arrows.

FIGS. 6*a* and 6*g* show various views of a cock plug 10 to be inserted into the valve unit 1.

The cock plug 10 on the lower side thereof has a slot 11 as an engagement element for a drive (see to this end also FIGS. 5*a* and 5*b*).

The cock plug 10 is at least partially or substantially configured so as to be circular-cylindrical. Said cock plug 10 possesses an upper portion 10-1 and a wider lower portion 10-2. The cock plug 10 preferably has a height of 1 to 3 cm. The upper portion 10-1 possesses a diameter of 0.5 to 1.5 cm, and/or the lower portion 10-2 possesses a diameter of 1 to 2 cm.

The cock plug 10 by way of the upper portion 10-1 thereof is press-fitted into the valve housing 14. The upper portion 10-1 herein substantially provides the surface seal. By contrast, the lower portion 10-2 provides a detent when press-fitting. An annular elevation 17 is provided in the lower region of the upper portion 10-1. This formed web 17, in conjunction with a protrusion 14*c* on or of a depression 14*c* in the valve housing 14, provides a latching connection.

In order for a duct in the valve 9 to be released in the opened state, the cock plug 10 comprises two passage openings 15 and 16. The passage openings 15 and 16 extend through the central axis of the cock plug 10. However, said passage openings 15 and 16 do not intersect. Said passage openings 15 and 16 are mutually separated.

There is a first upper passage opening 15 having an entry 15*a* at the top, and a second passage opening 16 having an entry 16*a* at the bottom. The exit 15*b* of the upper passage opening 15 and the exit 16*b* of the lower passage openings 16 lie at a height level of the cock plug 10. By a rotation of the cock plug 10, either the upper passage opening 15 or the lower passage openings 16 can thus be connected to the duct 12 by way of the opening 13 at the duct.

The exits 15*b* and 16*b* of the two passage openings 15 and 16 are in each case disposed in the shell of the cock plug 10 so as to be mutually offset by approximately 120°. The entries 15*a* and 16*a* of the two passage openings 15 and 16 are also in each case disposed in the shell of the cock plug 10 so as to be mutually offset by approximately 120°. The passage openings 15 and 16 possess a diameter of 2 to 5 mm.

FIG. 5*b* shows a perspective detailed illustration of a single receptacle 21 on the system for the valve unit 1.

The receptacle 21 comprises a plinth 25 and a protruding periphery 24 which serves as a form-fitting element for the latching hook 8 as well as the collar 19 of the valve unit 1. The receptacle 21 furthermore comprises entrainment elements 22 which can be rotated by means of a motor on the system.

The entrainment elements 22 are disposed in two straight rows, in a manner corresponding to that of the cock plugs 10, wherein the entrainment elements 22 of the one row are offset axially in relation to the entrainment elements 22 of the other row.

The entrainment elements 22 comprise engagement elements 23 formed in the manner of a screw driver, which in the state latched to the valve unit 1 engage in the slots 11 of the cock plugs 10. The cock plugs 10 can thus be rotated and the valves 9 activated by way of the entrainment elements 22.

While FIG. 5*b* shows a single receptacle 21 for fastening a single valve unit 1, FIG. 8*a* by contrast shows an embodiment in which a plurality of receptacles 21 are provided for fastening a plurality of valve units 1. In detail, three receptacles 21 for assembling three valve units 1 are illustrated here in an exemplary manner.

Finally, the receptacle 21 on the system, having valve units 1 placed thereon, is illustrated in FIG. 8*b*. The valve units 1 shown here serve only for illustration but are not a subject matter of the present invention. The individual valve units 1 can be connected to one another by way of hoses 6 indicated here. On account thereof, a system 1 having more than twelve source containers 15 can be operated.

A robust and reliable valve unit for a system for producing a medical preparation, for example for parenteral nutrition, can be provided by way of the invention.

LIST OF REFERENCE SIGNS

1 Valve unit
2 Housing
101 System
102 Main module

The invention claimed is:

1. A valve unit for a system for producing a medical preparation for parenteral nutrition, the valve unit comprising:
- a housing defining:
  - a duct extending along a longitudinal access of housing;
  - inlets; and
  - an outlet configured to be in fluid communication with each of the inlets via the duct, the inlets comprising upper inlets and lower inlets; and
- valves within the housing, each of the valves being configured to alternately connect a respective upper inlet of the upper inlets and a respective lower inlet of the lower inlets to the duct, each of the valves defining:
  - a first passage configured to fluidly connect the respective upper inlet and the duct; and
  - a second passage configured to fluidly connect the respective lower inlet and the duct, wherein:
- the first passage and the second passage each intersect a central axis of the valve,
- the first passage slopes downwardly from the respective upper inlet to the duct when the first passage fluidly connects the respective upper inlet and the duct,
- the second passage slopes upwardly from the respective lower inlet to the duct when the second passage fluidly connects the respective lower inlet and the duct, and
- each valve is rotatable within the housing between a closed position, a first opened position, and a second opened position.

2. The valve unit of claim 1, wherein, from the closed position, each valve is configured to rotate one of clockwise or counterclockwise in an amount between 45° and 70° to the first opened position.

3. The valve unit of claim 2, wherein the amount to rotate each valve from the closed position to the first opened position is 60°.

4. The valve unit of claim 2, wherein, from the closed position, each valve is configured to rotate the other of clockwise or counterclockwise between 45° and 70° to the second opened position.

5. The valve unit of claim 4, wherein the amount to rotate each valve from the closed position to the second opened position is 60°.

6. The valve unit of claim 1, wherein:
- neither the first passage nor the second passage are fluidly connected to the duct when the valves are in the closed position,
- the first passage fluidly connects the respective upper inlet to the duct when the valves are in the first opened position, and
- the second passage fluidly connects the respective lower inlet to the duct when the valves are in the second opened position.

7. The valve unit of claim 1, wherein a magnitude of the slope of the first passage is the same as a magnitude of the slope of the second passage.

8. The valve unit of claim 1, wherein a slope of the first passage is constant from an inlet of the first passage to an outlet of the first passage.

9. The valve unit of claim 1, wherein a slope of the second passage is constant from an inlet of the second passage to an outlet of the second passage.

10. The valve unit of claim 1, wherein a central axis of the duct is between central axes of upper inlets and central axes of the lower inlets.

11. The valve unit of claim 2, wherein:

a central axis of each of the upper inlets and of each of the lower inlets extend through a first plane that is coplanar with a lateral wall of the housing, the central axes of each of the upper inlets extend along a second plane that is offset vertically above a bottom of the housing by a first amount, the central axes of each of the lower inlets extend along a third plane that is offset vertically above the bottom of the housing by a second amount that is less than the first amount, the central axes of each of the upper inlets are vertically aligned with the central axes of a respective one of the central axes of the lower inlets, and the bottom of the housing is configured to connect to a receptacle of the system.

12. The valve unit of claim 11, wherein a central axis of the outlet is between the first plane and the second plane.

13. The valve unit of claim 1, wherein the valve unit is integral.

14. The valve unit of claim 1, wherein the upper inlets comprise at least three upper inlets and the lower inlets comprise at least three lower inlets.

15. The valve unit of claim 11, wherein the second plane is offset vertically above a top of the housing.

16. The valve unit of claim 13, wherein:

the upper inlets are first upper inlets, the lower inlets are first lower inlets, the valves are first valves, and the lateral wall is a first lateral wall, the inlets comprising second upper inlets and second lower inlets, the valve unit comprising second valves, each second valve being configured to alternately connect a respective second upper inlet of the second upper inlets and a respective second lower inlet of the second lower inlets to the outlet, a central axis of each of the second upper inlets and of each of the second lower inlets extend through a fourth plane that is coplanar with a second lateral wall of the housing, the central axes of each of the second upper inlets extend along the second plane, the central axes of each of the second lower inlets extend along the third plane, and the central axes of each of the second upper inlets are vertically aligned with the central axes of a respective one of the central axes of the second lower inlets.

17. The valve unit of claim 16, wherein the second lateral wall opposes the first lateral wall.

18. The valve unit of claim 16, wherein a central axis of the outlet extends perpendicular to the central axes of each of the first upper inlets, the second upper inlets, the first lower inlets, and the second lower inlets.

19. The valve unit of claim 1, wherein:

the first passage comprises a first outlet that is configured to fluidly connect to the duct and the second passage comprises a second outlet that is configured to fluidly connect to the duct, and the first outlet and the second outlet are the same size.

20. The valve unit of claim 19, wherein the first outlet and the second outlet are configured to be at a same height when fluidly connected to the duct.

* * * * *